(12) United States Patent
Sowles

(10) Patent No.: US 10,864,850 B1
(45) Date of Patent: Dec. 15, 2020

(54) LIGHT PIPE ASSEMBLIES FOR INTERIOR PANELS OF A VEHICLE

(71) Applicant: Toyota Motor Engineering & Manufacturing North America, Inc., Plano, TX (US)

(72) Inventor: Samuel L. Sowles, Tecumseh, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 0 days.

(21) Appl. No.: 16/522,826

(22) Filed: Jul. 26, 2019

(51) Int. Cl.
*B60Q 3/62* (2017.01)
*B60Q 3/53* (2017.01)
*B60Q 3/56* (2017.01)

(52) U.S. Cl.
CPC ............ *B60Q 3/53* (2017.02); *B60Q 3/56* (2017.02); *B60Q 3/62* (2017.02)

(58) Field of Classification Search
CPC ................ B60Q 3/50–59; B60Q 3/62–66
See application file for complete search history.

(56) References Cited

U.S. PATENT DOCUMENTS

| 7,938,566 | B2 | 5/2011 | Ishida et al. |
| 8,985,820 | B2 | 3/2015 | Mazur et al. |
| 9,254,785 | B2 | 2/2016 | Sohizad et al. |
| 2015/0003093 | A1* | 1/2015 | Omura ............... B60Q 3/78 362/511 |
| 2015/0274066 | A1 | 10/2015 | Del Pozo Gonzalez et al. |

FOREIGN PATENT DOCUMENTS

| JP | 4454467 B2 | 4/2010 |
| KR | 101806428 B1 | 12/2017 |

* cited by examiner

*Primary Examiner* — Sean P Gramling
(74) *Attorney, Agent, or Firm* — Dinsmore & Shohl LLP

(57) ABSTRACT

A light pipe assembly including an interior panel of a vehicle and a light pipe. The interior panel includes a channel integrally formed within the interior panel, where the channel has an engagement face, and a plurality of integrated retaining hooks are arranged along the channel. The plurality of integrated retaining hooks are spaced apart from one another and extend over the channel such that an engagement face of the plurality of integrated retaining hooks is arranged opposite the engagement face of the channel. The light pipe is arranged within the channel, where the light pipe is in direct contact with the engagement face of the plurality of integrated retaining hooks and the engagement face of the channel.

13 Claims, 4 Drawing Sheets

LIGHT PIPE ASSEMBLIES FOR INTERIOR PANELS OF A VEHICLE

TECHNICAL FIELD

The present specification generally relates to light pipe assemblies and, more specifically, to integrated light pipe assemblies with an interior panel of a vehicle.

BACKGROUND

Vehicles may need additional lighting within an interior compartment of the vehicle in order to illuminate the various storage compartments throughout the vehicle. For example, various storage compartments may be built integrally into the dashboard of a vehicle using the interior vehicle panels which make up the dashboard. Accordingly, these compartments can be arranged in such a way that neither sufficient light from an overhead light or the windows reaches the storage compartments. Additional lights can be placed within the storage compartments using clips, grippers, or slides, but these options add additional tooling into the manufacturing of the interior vehicle panels, and also includes the possibility of an A-surface being scratched or damaged during installation. Also, additional clips, grippers, and slides may block sufficient light from entering the storage compartment.

Accordingly, there is a need for improved lighting systems within a vehicle which includes a minimal number of components to retain a light pipe.

SUMMARY

In one embodiment, a light pipe assembly including an interior panel of a vehicle and a light pipe. The interior panel includes a channel integrally formed within the interior panel, where the channel has an engagement face, and a plurality of integrated retaining hooks are arranged along the channel. The plurality of integrated retaining hooks are spaced apart from one another and extend over the channel such that an engagement face of the plurality of integrated retaining hooks is arranged opposite the engagement face of the channel. The light pipe is arranged within the channel, where the light pipe is in direct contact with the engagement face of the plurality of integrated retaining hooks and the engagement face of the channel.

In another embodiment, a light pipe assembly includes an interior panel of a vehicle and a light pipe. The interior panel of a vehicle includes a channel, a plurality of integrated retaining hooks, a plurality of tensioning elements, and a cap. The channel is integrally formed within a top edge of the interior panel, where the channel has an engagement face. The plurality of integrated retaining hooks is arranged along the channel, where the plurality of integrated retaining hooks are spaced apart from one another and extend over the channel such that an engagement face of the plurality of integrated retaining hooks is arranged opposite the engagement face of the channel. The plurality of tensioning elements is arranged along the channel, where an at least one of the plurality of tensioning elements is arranged between each of the plurality of retaining hooks. The cap is integrally formed within the interior panel and arranged at an end of the channel. The light pipe is arranged within the channel, where the light pipe is in direct contact with the engagement face of the plurality of integrated retaining hooks, the engagement face of the channel, the plurality of tensioning elements, and the cap.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1:
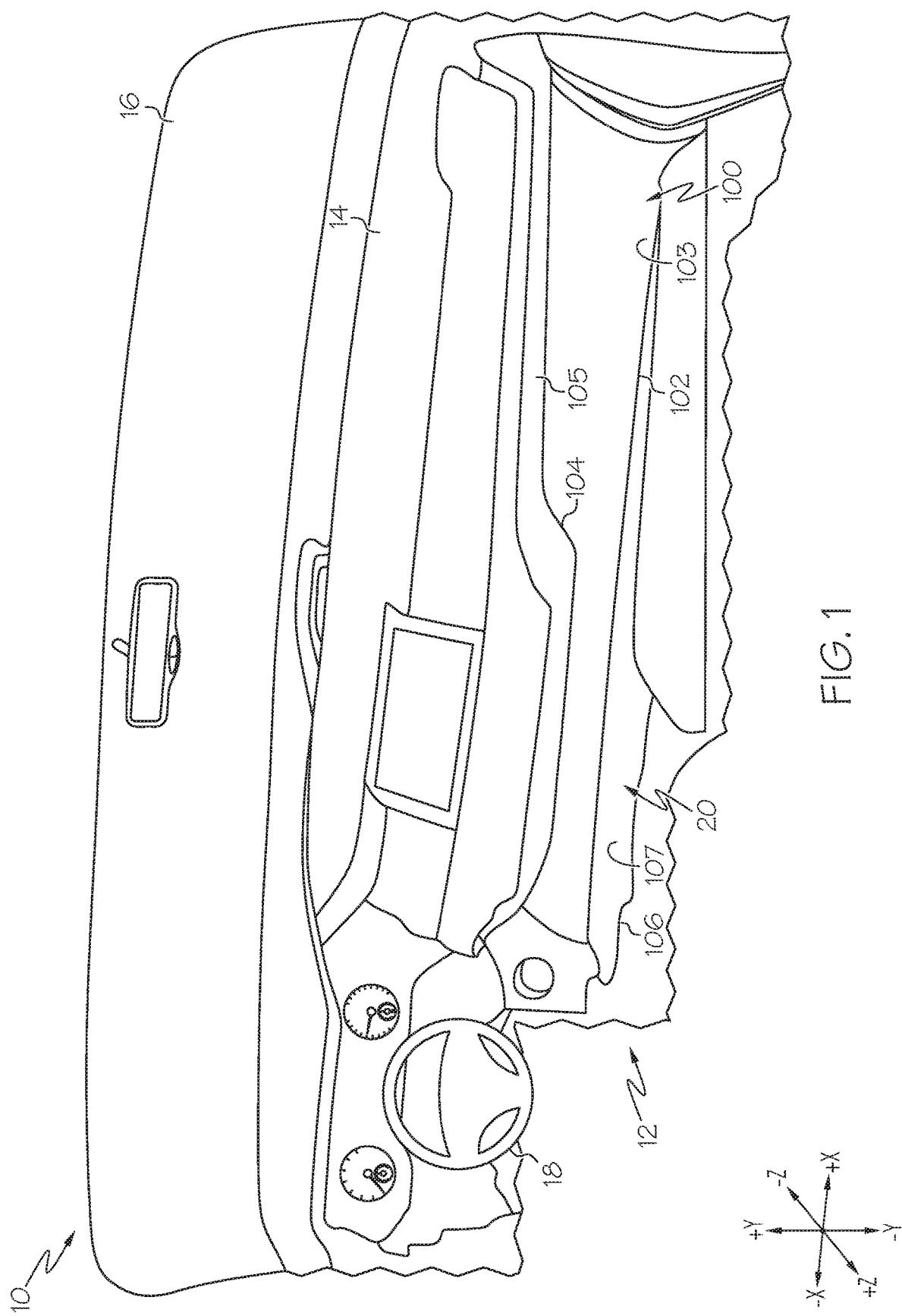
FIG. 1 schematically depicts an interior compartment of a vehicle including a light pipe assembly, according to one or more embodiments shown or described herein.

FIG. 1 generally depicts an embodiment of a light pipe assembly arranged within an interior compartment of a vehicle. The light pipe assembly generally includes an interior panel of the vehicle and a light pipe. As will be described in greater detail herein, the light pipe assembly may include a channel and a plurality of retaining hooks in order to retain the light pipe within the light pipe assembly. Furthermore, a plurality of tensioning elements may be arranged within the channel to aid in further retaining the light pipe within the light pipe assembly. Various embodiments of the light pipe assemblies will be described in greater detail herein.

As used herein, the term "vehicle longitudinal direction" refers to the forward-rearward direction of the vehicle (i.e., in the +/− vehicle Z-direction of the depicted coordinate axes). The term "vehicle lateral direction" refers to the cross-vehicle direction of the vehicle (i.e., in the +/− vehicle X-direction of the depicted coordinate axes), and is transverse to the vehicle longitudinal direction. The term "vehicle vertical direction" refers to the upward-downward direction of the vehicle (i.e., in the +/− vehicle Y-direction of the depicted coordinate axes). As used herein, "upper" and "above" are defined as the positive Y direction of the coordinate axis shown in the drawings. "Lower" and "below" are defined as the negative Y direction of the coordinate axis shown in the drawings. Further, the terms "outboard" as used herein refers to the relative location of a component with respect to a vehicle centerline. The term "inboard" as used herein refers to the relative location of a component with respect to the vehicle centerline. Because the vehicle structures may be generally symmetrical about a vehicle centerline, the direction to which use of terms "inboard" or "outboard" and refer may be mirrored about the vehicle centerline when evaluating components positioned along opposite sides.

Referring now to FIG. 1, an embodiment of a light pipe assembly 100 is generally depicted. As illustrated, the light pipe assembly 100 may be arranged within an interior space 10 of a vehicle. The interior space 10 of the vehicle may include a dashboard assembly 12, an upper dashboard 14, a windshield 16, a steering wheel 18, and a storage compartment 20. The dashboard assembly 12 includes a light pipe assembly panel 102, a surface 103, a top panel 104, a surface 105, a bottom panel 106, and a surface 107. The storage compartment 20 is arranged within the dashboard assembly 12 with the storage compartment 20 being formed from the light pipe assembly panel 102, the top panel 104, and the bottom panel 106. The surfaces 103, 105, and 107 of the light pipe assembly panel 102, top panel 104, and bottom panel 106 may be prevented from receiving sufficient light since the storage compartment 20 is longitudinally shifted within the dashboard assembly 12 in the −Z-direction. Due to the longitudinal shift of the storage compartment 20, additional lighting sources, such as a light pipe 122 (FIG. 3B) may be used to illuminate the storage compartment 20.

Figure 2:
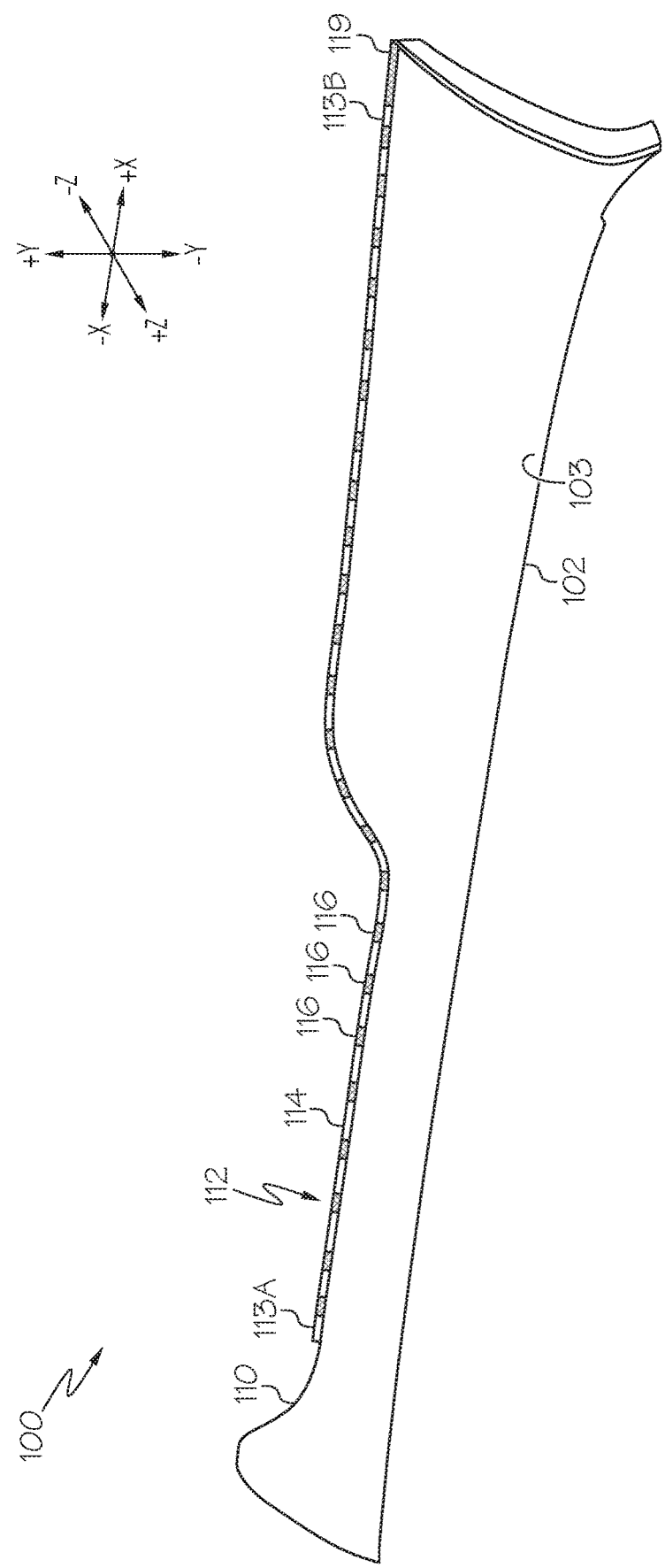
FIG. 2 schematically depicts the light pipe assembly of FIG. 1 disengaged from the interior compartment of the vehicle, according to one or more embodiments shown or described herein.

Referring now to FIG. 2, the light pipe assembly 100 may include the light pipe assembly panel 102 having a top edge 110, a channel 112, a plurality of retaining hooks 116, and a cap 119. As will be described in greater detail herein, the light pipe assembly 100 is configured to retain a light pipe 122 (FIG. 3B) within the channel 112 to illuminate the storage compartment 20. The channel 112 may include a first end 113A and a second end 113B arranged on opposite ends of the channel 112. A light source 150 (FIG. 3B) may be arranged at the first end 113A in order to illuminate a light pipe 122 arranged within the channel 112. The channel 112 may also include an engagement face 114 which faces in the +Z-direction. The retaining hooks 116 are arranged along the channel 112 in a spaced apart relationship and extend laterally along the top edge 110 of the channel 112 in the X-direction. The retaining hooks 116 may include an engagement face 117 which faces in the −Z-direction, directly opposite the engagement face 114 of the channel 112 (shown in FIG. 3A). In some embodiments, the channel 112 and retaining hooks 116 may be formed within the surface 103 or along the top edge 110, and follow the curved profile of the surface 103 or the top edge 110 without departing from the scope of this disclosure. The channel 112, retaining hooks 116, and cap 119 may be integrally formed with the light pipe assembly panel 102 in order to form a single panel which can be installed within the interior space 10 of a vehicle.

The cap 119 is opaque and in some embodiments, the cap 119 encapsulates a portion of the light pipe 122 at the second end 113B to prevent light from propagating out of the second end 113B. In other embodiments, without encapsulating a portion of the light pipe 122, the cap 119 still prevents light from propagating out of the second end 113B of the light pipe 122.

It is noted that the light pipe assembly 100 and/or various components thereof may be made from a variety of materials. For example, in one non-limiting embodiment, the light pipe assembly 100 is made from various plastics (e.g., polypropylene).

Figure 3A:
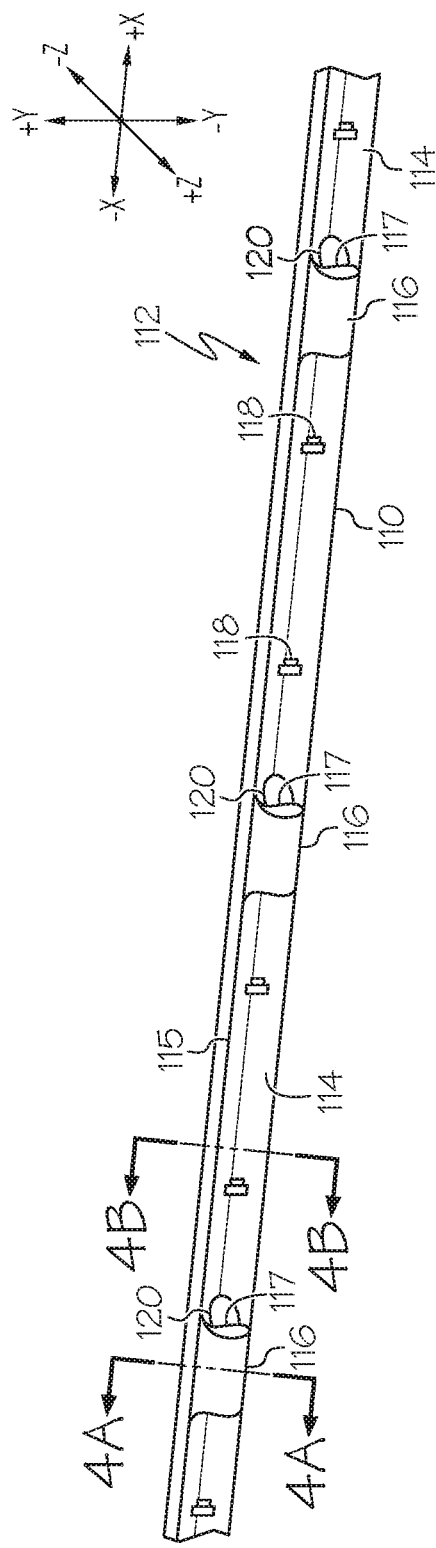
FIG. 3A schematically depicts a detailed view of the light pipe assembly of FIG. 2, according to one or more embodiments shown or described herein.

Referring now to FIG. 3A, a detailed view of the channel 112 is depicted. As discussed above, the channel 112 may include the engagement face 114 and the retaining hooks 116. In some embodiments, the channel 112 may further include a parting line 115, tensioning elements 118, and holes 120. The parting line 115 may be formed during the manufacturing of the light pipe assembly 100, specifically in an injection molding process. Even though the channel 112 and the retaining hooks 116 may be integral with one another, the parting line 115 can be used to determine where the channel 112 and retaining hooks 116 are joined. Additionally, holes 120 are formed during an injection molding process and used to form the retaining hooks 116, which will be described in greater detail below.

Still referring to FIG. 3A, the tensioning elements 118 protrude outward from the engagement face 114 of the channel 112 at locations laterally offset in the X-direction from the retaining hooks 116. In some embodiments, the tensioning elements 118 are integrally formed within the engagement face 114 of the channel 112 and extend outward in the −Z-direction from the engagement face 114 of the channel 112. Additionally, in some embodiments, at least one tensioning element 118 is arranged between each pair of retaining hooks 116. However, multiple tensioning elements 118 can be arranged between each pair of retaining hooks 116. Additionally, in some embodiments, the tensioning elements 118 are deformable and compressible in the Z-direction, which allows for a tension force to be placed on the light pipe 122 when arranged within the channel 112. The tensioning elements 118 may be compressed and deformed by a compression force when the light pipe 122 is placed between the channel 112 and the retaining hooks 116. Once the light pipe 122 is installed within the channel 112 and the compression force is removed, the deformed tensioning elements 118 will attempt to return to their original shape and position. This will generate the tension force which is imparted to the light pipe 122 between the retaining hooks 116 and the tensioning elements 118.

Figure 3B:
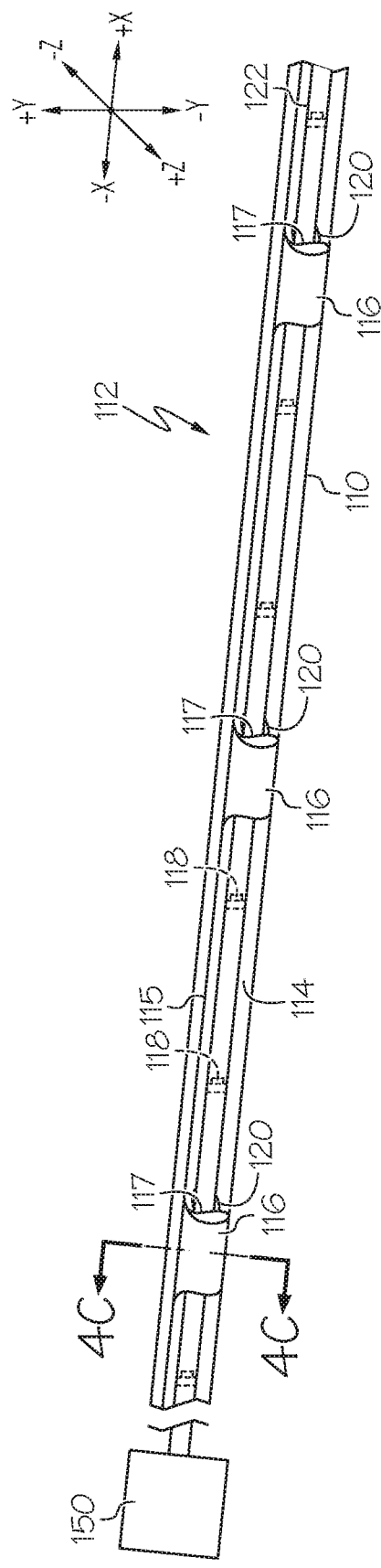
FIG. 3B schematically depicts a detailed view of the light pipe assembly of FIG. 2 engaged with a light pipe, according to one or more embodiments shown or described herein.

Referring now to FIG. 3B, the light pipe 122 may be arranged within the channel 112, and retained within the channel 112 by retaining hooks 116. In some embodiments, the light pipe 122 may be in direct contact with the engagement face 114 of the channel 112 and the engagement face 117 of the retaining hooks 116. The tensioning elements 118 may place the light pipe 122 under a tension force in the +Z-direction in order to further retain the light pipe 122 within the channel 112. In some embodiments, the retaining hooks 116 are deformable, allowing for the light pipe 122 to the snapped into place along each retaining hooks 116. In some embodiments, the retaining hooks 1116 are rigid, and the light pipe 122 be slid into the channel 112 the first end 113A or the second end 113B (i.e. from whichever end is opposite the cap 119).

In some embodiments, the light pipe 122 may compose a transparent acrylic tube which is deformable, allowing the light pipe 122 to follow the curved profile of the channel 112. Additionally, the light pipe 122 may be optically coupled to a light source 150 to allow light from the light source 150 to propagate through the body of the light pipe 122 emitting outward from the light pipe 122 into the storage compartment 20.

Though the retaining hooks 116 prevent light from exiting the light pipe 122 at the location where the retaining hooks 116 contact the light pipe 122, sufficient light can pass through light pipe 122 at locations away from the retaining hooks 116 to illuminate the storage compartment 20 (FIG. 1). Since the retaining hooks 116 are integral with the light pipe assembly panel 102, the retaining hooks 116 may be smaller and/or less numerous compared to using additional clips or slides to retain the light pipe 122 to the light pipe assembly 100.

Figure 4A:
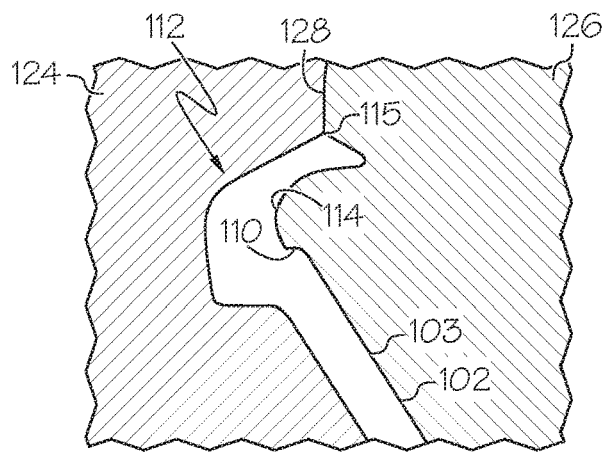
FIG. 4A schematically depicts a cross-sectional view of the light pipe assembly taken generally along line 4A-4A in FIG. 3A, according to one or more embodiments shown or described herein.
Figure 4B:
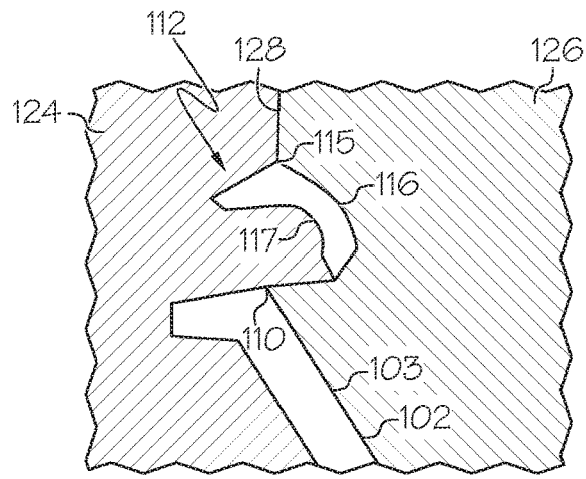
FIG. 4B schematically depicts a cross-sectional view of the light pipe assembly taken generally along line 4B-4B in FIG. 3A, according to one or more embodiments shown or described herein.

Referring now to FIGS. 4A and 4B, during manufacturing of the light pipe assembly 100, the parting line 115 and the retaining hooks 116 may be integrally formed with the light pipe assembly panel 102. The mold used for the injection molding process includes dies 124 and 126, which are joined at line 128. The line 128 between the dies 124 and 126 forms the parting line 115 of the light pipe assembly 100. The dies 124 and 126 are designed to form the retaining hooks 116 only at specific lateral locations along the X-direction. In order to form the retaining hooks 116, dies 124 and 126 are designed to allow die 124 to pass further into die 126, which allows for the molding of the retaining hooks 116. This process also forms holes 120 as a byproduct. By arranging the parting line 115 at the top of the light pipe assembly 100, good material flow through the dies 124 and 126 can occur, thereby forming the light pipe assembly 100.

Figure 4C:
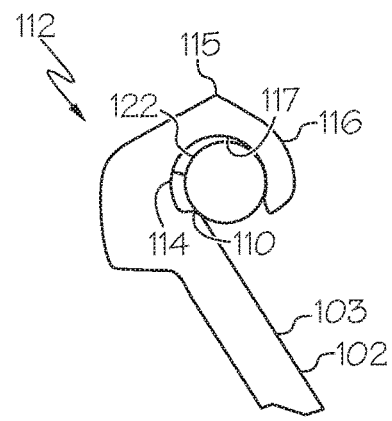
FIG. 4C schematically depicts a cross-sectional view of the light pipe assembly taken generally along line 4C-4C in FIG. 3B, according to one or more embodiments shown or described herein.

Referring now to FIG. 4C, as described above, the light pipe 122 may be arranged between the channel 112 and the retaining hooks 116. As depicted in the drawing, the light pipe 122 is held within the channel 112, and is direct contact with the engagement face 114 of the channel 112 and the engagement face 117 of the retaining hooks 116. Due to the arrangement of the retaining hooks 116, the light pipe 122 can pass light through the gap formed between the channel 112 and the retaining hooks 116 in order to illuminate the surface 103 of the light pipe assembly panel 102.

It should now be understood that embodiments described herein are directed to a light pipe assembly generally including a channel, a plurality of integrated retaining hooks, a plurality of tensioning elements, and a cap. The channel is integrally formed within a top edge of the interior panel, where the channel has an engagement face. The plurality of integrated retaining hooks is arranged along the channel, where the plurality of integrated retaining hooks are spaced apart from one another and extend over the channel in order to retain a light pipe within the channel. The plurality of tensioning elements is arranged along the channel and arranged between the plurality of retaining hooks in order to provide a tension force on the light pipe. The cap is integrally formed within the interior panel and arranged at an end of the channel. The light pipe is arranged within the channel, where the light pipe is in direct contact with the engagement face of the plurality of integrated retaining hooks, the engagement face of the channel, the plurality of tensioning elements, and the cap.

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

What is claimed is:

1. A light pipe assembly, comprising:
   an interior panel of a vehicle, comprising:
      a channel integrally formed within the interior panel, wherein the channel has an engagement face;
      a plurality of integrated retaining hooks arranged along the channel, wherein the plurality of integrated retaining hooks are spaced apart from one another and extend over the channel such that an engagement face of the plurality of integrated retaining hooks is arranged opposite the engagement face of the channel; and
      a plurality of tensioning elements each comprising an end face, wherein the plurality of tensioning elements protrude outward from the engagement face of the channel and each terminate at the end face; and
   a light pipe arranged within the channel, wherein the light pipe is in direct contact with the engagement face of the plurality of integrated retaining hooks and the end face of the plurality of tensioning elements.

2. The light pipe assembly of claim 1, further comprising a light source optically coupled to a first end of the light pipe.

3. The light pipe assembly of claim 1, wherein an opaque cap is positioned at an end of the channel.

4. The light pipe assembly of claim 1, wherein the channel is arranged along a top edge of the interior panel.

5. The light pipe assembly of claim 1, wherein the plurality of tensioning elements protrude outward from the channel at locations laterally offset from the plurality of integrated retaining hooks.

6. The light pipe assembly of claim 1, wherein the light pipe is placed under tension between the plurality of tensioning elements and the plurality of integrated retaining hooks.

7. The light pipe assembly of claim 1, wherein the light pipe faces a compartment of the vehicle when the interior panel is arranged within an interior of the vehicle.

8. The interior panel of claim 1, wherein the plurality of integrated retaining hooks are deformable.

9. The interior panel of claim 1, wherein the plurality of integrated retaining hooks are rigid.

10. A light pipe assembly, comprising:
    an interior panel of a vehicle, comprising:
       a channel integrally formed within a top edge of the interior panel, wherein the channel has an engagement face;
       a plurality of integrated retaining hooks arranged along the channel, wherein the plurality of integrated retaining hooks are spaced apart from one another and extend over the channel such that an engagement face of the plurality of integrated retaining hooks is arranged opposite the engagement face of the channel;
       a plurality of tensioning elements arranged along the channel, wherein:
          an at least one of the plurality of tensioning elements is arranged between each of the plurality of integrated retaining hooks;
          the plurality of tensioning elements each comprise an end face; and
          the plurality of tensioning elements protrude outward from the engagement face of the channel and each terminate at the end face; and
       a cap integrally formed within the interior panel and arranged at an end of the channel; and
    a light pipe arranged within the channel, wherein the light pipe is in direct contact with the engagement face of the plurality of integrated retaining hooks, the end face of the plurality of tensioning elements, and the cap.

11. The light pipe assembly of claim 10, further comprising a light source optically coupled to a first end of the light pipe.

12. The light pipe assembly of claim 10, wherein the cap is opaque.

13. The light pipe assembly of claim 10, wherein the light pipe is placed under tension between the plurality of tensioning elements and the plurality of integrated retaining hooks.

\* \* \* \* \*